US010683797B2

(12) United States Patent
Morikawa et al.

(10) Patent No.: US 10,683,797 B2
(45) Date of Patent: Jun. 16, 2020

(54) WASTE GATE VALVE CONTROL METHOD AND CONTROL DEVICE (71) Applicant: NISSAN MOTOR CO., LTD., Yokohama-shi, Kanagawa (JP)

(72) Inventors: Masashi Morikawa, Kanagawa (JP); Tsubasa Endo, Kanagawa (JP); Mitsuhiko Kubota, Kanagawa (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 2 days.

(21) Appl. No.: 16/071,609

(22) PCT Filed: Dec. 20, 2016

(86) PCT No.: PCT/JP2016/087871
§ 371 (c)(1),
(2) Date: Jul. 20, 2018

(87) PCT Pub. No.: WO2017/126277
PCT Pub. Date: Jul. 27, 2017

(65) Prior Publication Data
US 2019/0032548 A1 Jan. 31, 2019

(30) Foreign Application Priority Data
Jan. 22, 2016 (JP) ................. 2016-010528

(51) Int. Cl.
F02B 37/18 (2006.01)
F02D 41/08 (2006.01)
(Continued)

(52) U.S. Cl.
CPC .......... *F02B 37/186* (2013.01); *F01D 17/105* (2013.01); *F02B 37/18* (2013.01);
(Continued)

(58) Field of Classification Search
CPC ...... F01D 17/105; F02B 37/18; F02B 37/186; F02C 6/12; F02D 41/0007; F02D 41/068;
(Continued)

(56) References Cited

U.S. PATENT DOCUMENTS 4,646,522 A    3/1987  Mamiya et al.
9,103,272 B2 * 8/2015  Buckland .............. F02B 37/183
(Continued)

FOREIGN PATENT DOCUMENTS

EP    2 803 842 A1    11/2014
JP    61-16239 A      1/1986
(Continued)

Primary Examiner — Jesse S Bogue
(74) Attorney, Agent, or Firm — Foley & Lardner LLP (57) ABSTRACT A waste gate valve (7) of a turbocharger (3) is fully opened during idling after warm-up is completed in order to reduce exhaust resistance. However, during idling in an engine cold state when a cooling water temperature (TW) is below a threshold value (TW1), the waste gate valve (7) is open-loop controlled to an intermediate opening degree that is smaller than full opening. An ignition timing is delayed (retarded) for catalyst warm-up. When the cooling water temperature (TW) reaches (t3) the threshold value (TW1), the opening degree of the waste gate valve (7) is set to full opening. When an accelerator opening degree (APO) becomes large (t4) before warm-up is completed, the limitation of the opening degree is released.

9 Claims, 5 Drawing Sheets (51) Int. Cl.
*F02D 41/00* (2006.01)
*F02D 41/06* (2006.01)
*F02P 5/04* (2006.01)
*F01D 17/10* (2006.01)
*F02C 6/12* (2006.01)

(52) U.S. Cl.
CPC ............ *F02C 6/12* (2013.01); *F02D 41/0007* (2013.01); *F02D 41/068* (2013.01); *F02D 41/08* (2013.01); *F02P 5/04* (2013.01); *F05D 2220/40* (2013.01); *Y02T 10/144* (2013.01)

(58) Field of Classification Search
CPC ........ F02D 41/08; F02P 5/04; F05D 2220/40; Y02T 10/144
See application file for complete search history.

(56) References Cited

U.S. PATENT DOCUMENTS

| | | | | |
|---|---|---|---|---|
| 9,109,505 | B2 * | 8/2015 | Ulrey | F02B 47/08 |
| 2011/0011082 | A1 * | 1/2011 | Mehta | F01N 3/101 60/602 |
| 2013/0098032 | A1 * | 4/2013 | Wade | F02B 37/18 60/602 |
| 2014/0060009 | A1 * | 3/2014 | Zhang | F01N 3/18 60/274 |
| 2014/0325983 | A1 * | 11/2014 | Tsunooka | F02D 9/02 60/602 |
| 2014/0360182 | A1 * | 12/2014 | Boyer | F02B 37/183 60/602 |

FOREIGN PATENT DOCUMENTS

| | | |
|---|---|---|
| JP | 4-287835 A | 10/1992 |
| JP | 2002-364503 A | 12/2002 |
| JP | 2003-254051 A | 9/2003 |
| JP | 2007-77840 A | 3/2007 |
| JP | 2007-303294 A | 11/2007 |
| JP | 2009-228486 A | 10/2009 |
| JP | 2013-19319 A | 1/2013 |
| JP | 2014-58894 A | 4/2014 |
| JP | 2015-25386 A | 2/2015 |
| JP | 2015-48837 A | 3/2015 |
| JP | 2015-183624 A | 10/2015 |
| JP | 2015-222065 A | 12/2015 |
| JP | 2016-8560 A | 1/2016 |

* cited by examiner

WASTE GATE VALVE CONTROL METHOD AND CONTROL DEVICE

TECHNICAL FIELD

This invention relates to valve opening control of a waste gate valve which is provided to a turbocharger.

BACKGROUND TECHNOLOGY

In general, a turbocharger used for supercharging of an internal combustion engine is provided with a waste gate valve at a turbine part which is configured so as to bypass a part of exhaust flow without passing through a turbine wheel, for supercharging pressure control. In a patent document 1, as a driving mechanism for the open/close driving of the waste gate valve, a so-called swing type mechanism is disclosed in which the linear motion of a rod of an electric actuator is converted to the rotational motion of a rotation shaft through a link and then a poppet type valve body which is supported on the distal end of an arm fixed to the rotation shaft oscillates.

In such the above waste gate valve, as described in the patent document 1, in a part of the driving mechanism, a small clearance exists, for example, between the distal end of the arm and the poppet type valve body or between the distal end of the rod and the link.

On the other hand, at the time of the idling in a state in which the internal combustion engine is cold, although an ignition timing retard is executed for catalyst warm-up of an exhaust system, the pressure fluctuation of exhaust gas, specifically, exhaust pulsation becomes large with the ignition timing retard. In addition, in general, at the time of idling, the opening degree of the waste gate valve is controlled to full opening to reduce exhaust resistance, and a part of the exhaust flow passes through the periphery of the valve body.

Therefore, at the time of the idling in the engine cold state, in which the exhaust pulsation becomes large, the valve body is vibrated caused by the above clearance, and consequently, abnormal sound tends to occur.

PRIOR ART REFERENCE

Patent Document

Patent Document 1: Japanese Patent Application Publication 2015-48837

SUMMARY OF THE INVENTION

The present invention is one which controls the opening degree of a waste gate valve, at the time of an idling in a state in which an internal combustion engine is cold or at the time of deceleration. In this way, by controlling the opening degree of the waste gate valve to be small, the amount of an exhaust flow which passes through the periphery of a valve body of the waste gate valve is reduced, and thereby the movement of the valve body caused by exhaust pulsation and pressure fluctuation is suppressed. Consequently, abnormal sound caused by clearance hardly occurs.

According to the present invention, it is possible to suppress the occurrence of the abnormal sound in the waste gate valve at the time of the idling in the engine cold state, in which the exhaust pulsation becomes large, or at the time of the deceleration.

MODE FOR IMPLEMENTING THE INVENTION

In the following, an embodiment of the present invention will be explained in detail based on the drawings.

Figure 1:
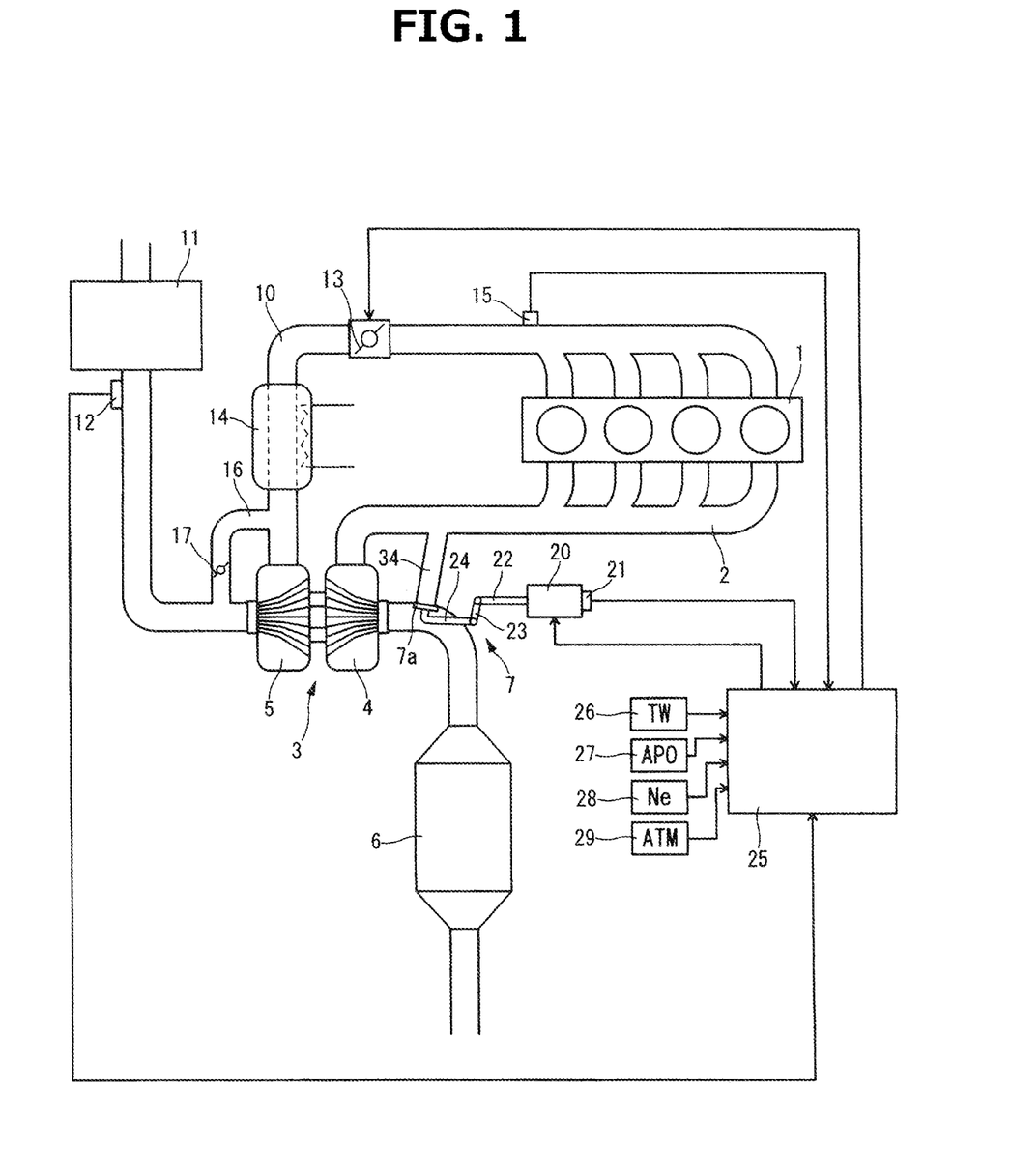
FIG. 1 is an explanatory drawing showing a system configuration of an embodiment of the present invention.

FIG. 1 is a schematic explanatory drawing showing the system configuration of an embodiment of the present invention. An exhaust passage 2 of an internal combustion engine 1 that is a spark ignition type gasoline engine is disposed with an exhaust gas turbine 4 of a turbocharger 3, and on its downstream side, a catalyst converter 6 in which, for example, a three way catalyst is used is disposed. An exhaust muffler which is not shown in the drawings is provided on the further downstream side of exhaust passage 2, and exhaust passage 2 is opened outside via the exhaust muffler. Exhaust gas turbine 4 is provided with a waste gate valve 7 for supercharging pressure control. In addition, internal combustion engine 1 has, for example, a direct injection type configuration, and a fuel injection valve for injecting fuel into cylinders, which is not shown in the drawings, is provided in each cylinder, and an ignition plug which is not shown in the drawings is provided in each of the cylinders. Internal combustion engine 1 is not limited to the direct injection type, and may be a port injection type fuel injection device.

An intake passage 10 of internal combustion engine 1 is disposed with an air cleaner 11, an air flow meter 12 and a throttle valve 13 arranged in this order from the upstream side. A compressor 5 of turbocharger 3 is disposed between air flow meter 12 and throttle valve 13. In addition, in the embodiment shown in the drawing, a water-cooled type or an air-cooled type intercooler 14 is interposed between compressor 5 and throttle valve 13. Moreover, intake passage 10 is provided with a recirculation passage 16 which communicates between the upstream side and the downstream side of compressor 5. This recirculation passage 16 is provided with a recirculation valve 17. This recirculation valve 17 has a function of circulating intake air by opening the valve at the time of deceleration when throttle valve 13 is suddenly closed.

A supercharging pressure sensor 15 for detecting supercharging pressure is disposed on the downstream side of throttle valve 13 of intake passage 10.

Waste gate valve 7 has a configuration in which the opening degree of waste gate valve 7 is controlled by an electric actuator 20, and a position sensor 21 is included in electric actuator 20 to detect an actual opening degree. Specifically, electric actuator 20 outputs the rotation of an electric motor as the movement in the axial direction of a rod 22 by a ball screw mechanism, and position sensor 21 detects the axial direction position of rod 22 with respect to the case of the actuator. Rod 22 is linked to a poppet type valve body 7a of waste gate valve 7 via a link 23 and an arm 24.

The operation of electric actuator 20 is controlled by an engine controller 25 which performs various kinds of control of internal combustion engine 1. In addition to the detection signals of supercharging pressure sensor 15 and position sensor 21, detection signals of sensors, such as a cooling water temperature sensor 26 which detects a cooling water temperature TW of internal combustion engine 1, an accelerator opening degree sensor 27 which detects an accelerator depressing amount which is not shown in the drawings, that is, an accelerator opening degree APO, a crank angle sensor 28 which detects a rotation speed Ne of internal combustion engine 1 and an atmospheric pressure sensor 29 which detects an atmospheric pressure ATM, are input to engine controller 25. The opening degree of throttle valve 13, the fuel injection amount of the fuel injection valves which are not shown in the drawings and the ignition timing of the ignition plugs which is not shown in the drawings are also controlled by engine controller 25.

Figure 2:
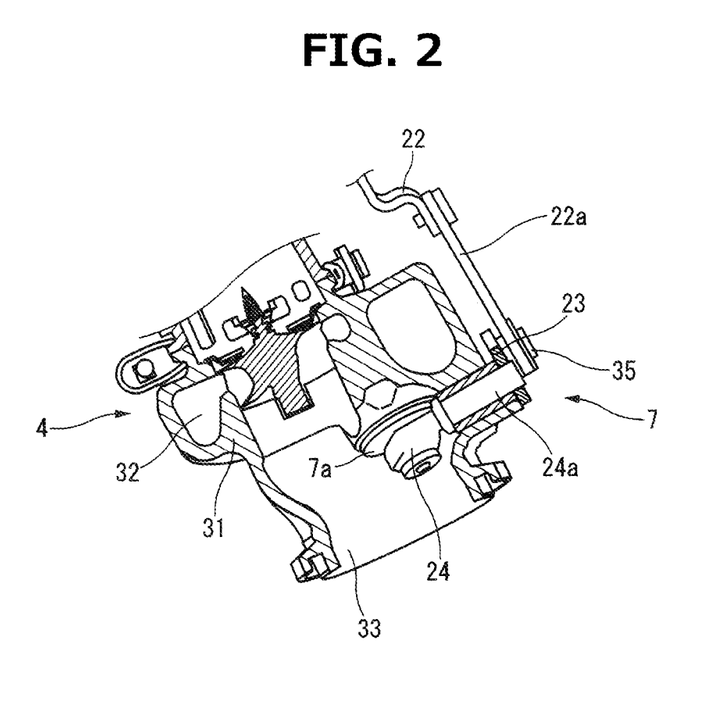
FIG. 2 is a sectional view showing a main part of a turbocharger.

FIG. 2 shows a more specific configuration example of waste gate valve 7 provided to exhaust gas turbine 4 of turbocharger 3. As shown in the drawing, valve body 7a of waste gate valve 7 is positioned at an exhaust outlet portion 33 of a turbine housing 31 having a scroll portion 32, and is configured to open and close a bypass passage 34 (schematically shown in FIG. 1) from exhaust outlet portion 33 side, which communicates the upstream side part of scroll portion 32 with exhaust outlet portion 33. This waste gate valve 7 has a so-called swing type configuration, and valve body 7a is supported on the distal end of arm 24 having a shaft portion 24a. Shaft portion 24a is rotatably supported on turbine housing 31, and one end of link 23 is fixed to the base end of shaft portion 24a which is exposed to the outer surface of turbine housing 31. Rod 22 of electric actuator 20, for detail, an intermediate rod 22a is connected to the other end of link 23 via a pin 35. The basic configuration of the swing type waste gate valve is publicly known by, for example, Japanese Patent Application Publication No. 2014-58894. In this configuration, arm 24 oscillates with shaft portion 24a as a center by the axial direction movement of rod 22 of electric actuator 20, and with this, circular valve body 7a opens and closes the distal end opening of bypass passage 34.

Figure 3:
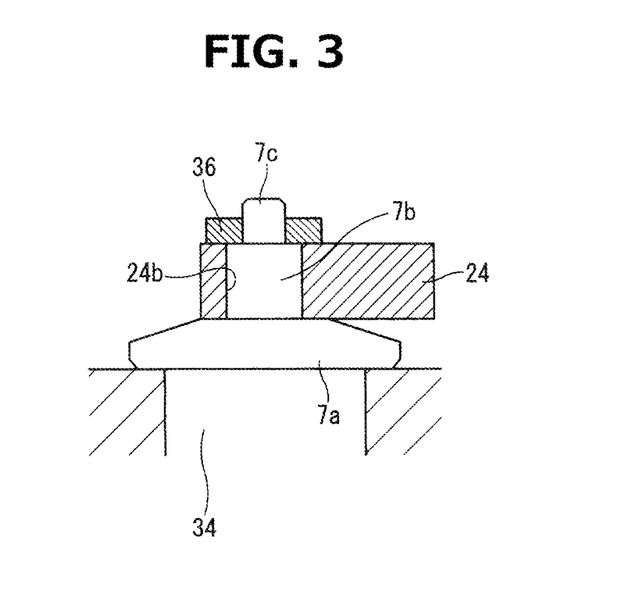
FIG. 3 is a main part enlarged view showing a valve body attachment structure of a waste gate valve.

FIG. 3 shows an example of the attachment structure of valve body 7a in the distal end of arm 24. As shown in the drawing, a shaft portion 7b in the center of valve body 7a penetrates an attachment hole 24b of arm 24, and is prevented from coming out by attaching a ring-shaped fixing member 36 to a small diameter portion 7c at the distal end of shaft portion 7b. With this, small clearances exist between arm 24 and valve body 7a and between shaft portion 7b and the inner circumferential surface of attachment hole 24b, and consequently, there is possibility that abnormal sound occurs caused by vibration. In addition, clearance also exists at the connection part between link 23 and rod 22, and consequently, this part can be an abnormal sound occurrence part.

Next, with reference to FIG. 4 to FIG. 6, the drive control of waste gate valve 7 in the above embodiment will be explained.

Figure 4:
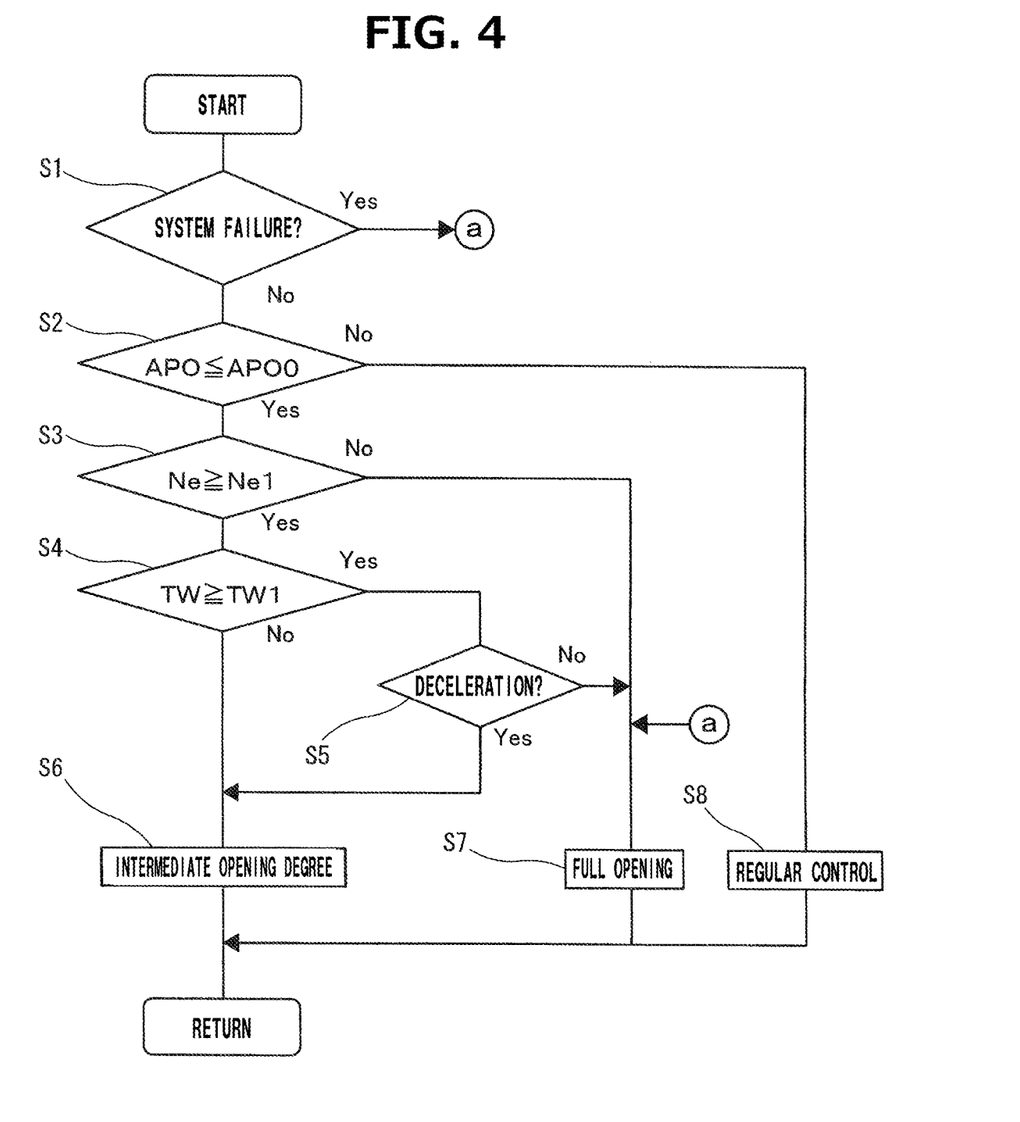
FIG. 4 is a flow chart showing a flow of control of an embodiment.

FIG. 4 is a flow chart showing a flow of the process of the opening degree control of waste gate valve 7 which is executed by the above engine controller 25 that corresponds to a control section. First, in a step 1, it is judged whether or not a system is in a system failure state based on a self-diagnostic result of the system which is executed in other control routines. In case of some emergency (abnormality) that affects supercharging control, such as failure of sensors such as supercharging pressure sensor 15 and disconnection, the system is judged to be in the system failure state, and the process proceeds to a step 7, and then a target opening degree of waste gate valve 7 is fixed to full opening for fail-safe, regardless of the operation condition. Consequently, unexpected supercharging can be avoided.

In a next step 2, it is judged whether or not accelerator opening degree APO, which is detected by accelerator opening degree sensor 27, is at a threshold value APO0 that corresponds to a full closing position or less. Threshold value APO0 is a value which is appropriately learned and updated in a state in which an accelerator pedal is released.

In case where accelerator opening degree APO is not at threshold value APO0 or less, that is, in case where the accelerator pedal is slightly depressed, the process proceeds to a step 8, and regular opening control for supercharging pressure control (in other words, torque control) is executed. In FIG. 5, a feature of the opening degree of waste gate valve 7 to an engine rotation speed and a torque is shown in a contour line shape. In an area "a" in which a load is high and the rotation speed is low, waste gate valve 7 is fully closed, and as shown by an arrow, the opening degree of waste gate valve 7 is increased more as the load becomes lower and the rotation speed becomes higher from the area "a" toward the right lower side of the figure. In this way, the area in which the opening degree of waste gate valve 7 is continuously changed is a so-called supercharging area, and by the opening control of waste gate valve 7, the torque of internal combustion engine 1 is controlled, while the opening degree of throttle valve 13 is basically set to full opening. In a lower load area "b" than a predetermined torque T1, waste gate valve 7 becomes full opening. In this area "b", the supercharging is not substantially performed, and as a non-supercharging area, that is, a natural intake area, by the opening degree of throttle valve 13, the torque is controlled.

More specifically, a target supercharging pressure (more strictly, a target pressure ratio) is given by a predetermined control map based on the engine rotation speed and a required torque, and to achieve this target, the target opening degree of waste gate valve 7 is feedback-controlled by using the detection signal of supercharging pressure sensor 15. As a result of this supercharging pressure feedback control, an opening degree feature shown in FIG. 5 can be obtained. In addition, electric actuator 20 is feedback-controlled based on the deviation of the above target opening degree and the opening degree detected by position sensor 21.

In step 2 of FIG. 4, when accelerator opening degree APO is at threshold value APO0 or less, the process proceeds to a step 3, and it is judged whether or not an engine rotation speed Ne is at a threshold value Ne1 for perfect ignition judgement after the start or more. Here, in case where engine rotation speed Ne is lower than threshold value Ne1, that is, during cranking at the time of the start, the process proceeds to step 7, and the target opening degree of waste gate valve 7 is set to full opening. In this way, by setting the opening degree of waste gate valve 7 to full opening, exhaust resistance by exhaust gas turbine 4 becomes minimum.

In a state after the start of internal combustion engine 1 is completed, that is, when rotation speed Ne is at threshold value Ne1 or more, the process proceeds from step 3 to a step 4, and it is judged whether or not cooling water temperature TW is at a threshold value TW1 or more, threshold value TW1 which is for performing the judgement whether or not the engine is in a cold state. Here, in case where cooling water temperature TW is lower than threshold value TW1, the process proceeds to a step 6, and the target opening degree of waste gate valve 7 is set to a predetermined intermediate opening degree that is smaller than full opening. That is, during idling in the engine cold state when cooling water temperature TW is lower than threshold value TW1, the process proceeds to step 6 via the judgements of steps 2, 3 and 4, and the opening degree of waste gate valve 7 is limited to the intermediate opening degree. As an example, when, as the moving amount of electric actuator 20, full opening is defined as 100%, the intermediate opening degree is 40-50% of the full opening.

Threshold value TW1 is set to be equal to a threshold value to determine whether or not an ignition timing retard is executed for early activation of the catalyst of catalyst converter 6 after the cold start. Threshold value TW1 is an appropriate value within a range of, for example, 40-60° C. When cooling water temperature TW is lower than threshold value TW1 at the time of the start, the ignition timing is corrected to be delayed with a retard amount in accordance with cooling water temperature TW by other control routines which are not shown in the drawings. By this ignition timing retard, exhaust gas temperature is raised. On the other hand, because the peak of combustion pressure becomes a retard side with the ignition timing retard, exhaust pulsation of the exhaust gas emitted from internal combustion engine 1 is increased. Consequently, if waste gate valve 7 is fully opened, valve body 7a is vibrated, and abnormal sound caused by the above-mentioned clearances of each part of waste gate valve 7 tends to occur. However, as mentioned above, by setting the opening degree of waste gate valve 7 to the intermediate opening degree that is smaller than the full opening, the amount of the exhaust flow passing through the periphery of valve body 7a becomes relatively small, and thereby the abnormal sound is suppressed.

In step 4, when cooling water temperature TW is at threshold value TW1 or higher, the process proceeds to a step 5, and it is judged whether or not sudden deceleration operation (for example, sudden release of the accelerator pedal) is executed from the comparison with acceleration opening degree APO immediately before it. In case where accelerator opening degree APO is rapidly decreased, it is judged as a sudden deceleration state. When it is not in the sudden deceleration state, the process proceeds from step 5 to step 7, and the target opening degree of waste gate valve 7 is set to full opening. Therefore, during the idling after warm-up is completed, the opening degree of waste gate valve 7 basically becomes full opening, and the exhaust resistance by exhaust gas turbine 4 becomes minimum.

In case where the result of the judgement in step 5 is the sudden deceleration state, for example, during a relatively short predetermined time, the process proceeds from step 5 to step 6, and the target opening degree of waste gate valve 7 is not set to full opening but is set to the intermediate opening degree. This process is performed in consideration that when waste gate valve 7 is fully closed and then waste gate valve 7 is fully opened with the deceleration operation from a state in which exhaust gas pressure is high, valve body 7a tends to be vibrated caused by a large pressure fluctuation. At the time of the deceleration, by setting the opening degree to the intermediate opening degree that is smaller than full opening similarly at the time of the above-mentioned idling in the engine cold state, the vibration of valve body 7a and the occurrence of abnormal sound can be suppressed.

In addition, the process at the time of the sudden deceleration is not always necessary, and it can be omitted. Even if abnormal sound occurs caused by the clearance in waste gate valve 7, a driver relatively hardly feels odd feeling because the abnormal sound is covered with other sounds during vehicle travel.

Figure 6:
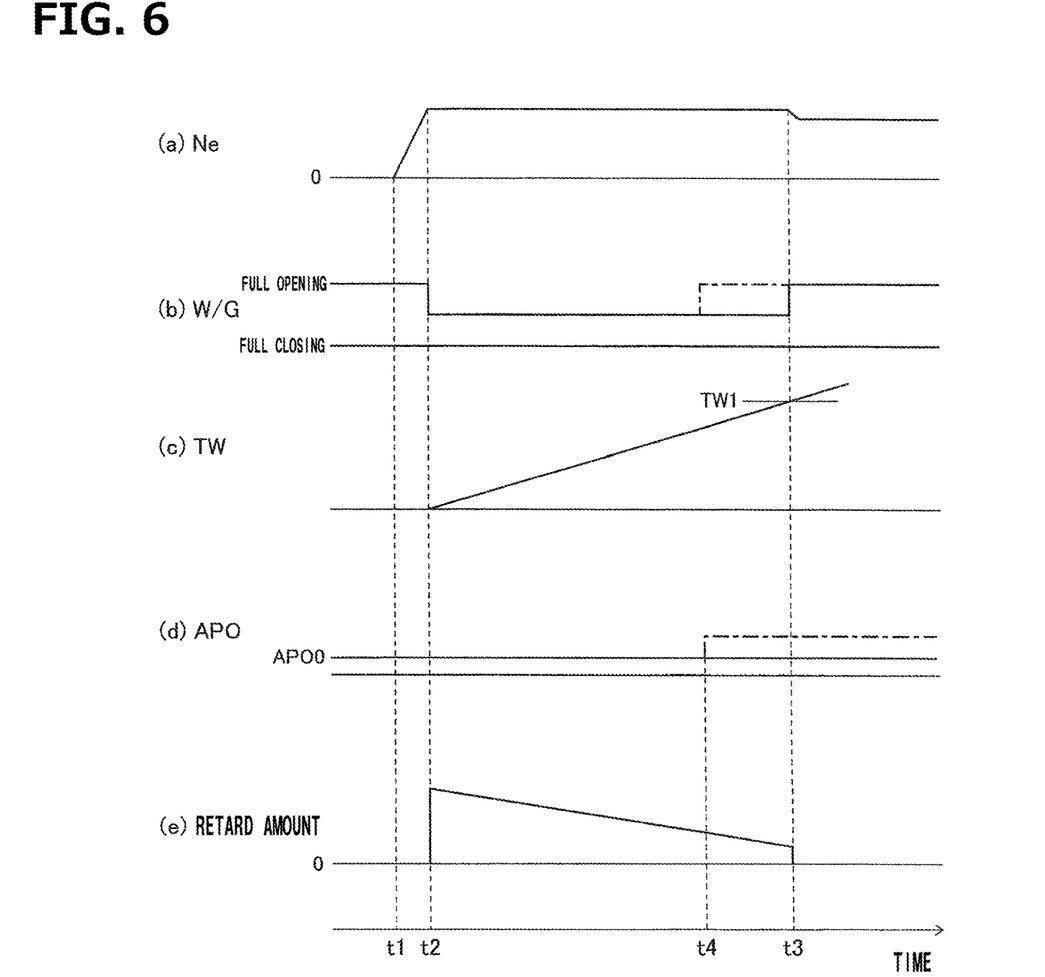
FIG. 6 is a time chart showing a change in the opening degree when being left idling after cold engine start.

FIG. 6 is a time chart after the cold start, and comparatively shows changes in (a) engine rotation speed Ne, (b) the opening degree of waste gate valve 7, (c) cooling water temperature TW, (d) accelerator opening degree APO and (e) the ignition timing retard amount. Although, at a time t1, cranking is started by key-ON operation of a driver, the opening degree of waste gate valve 7 is full opening while the engine is stopped, and the opening degree thereof is also full opening during the cranking until engine rotation speed Ne reaches a predetermined threshold value Ne1. When, at a time t2, the engine start is completed and engine rotation speed Ne reaches threshold value Ne1, based on the judgement of water temperature TW, the opening degree of waste gate valve 7 is changed to the intermediate opening degree. In addition, the ignition timing is corrected to be delayed with a retard amount in accordance with cooling water temperature TW for catalyst warm-up, because cooling water temperature TW is low. As mentioned above, although the exhaust pulsation of the exhaust gas is increased with the ignition timing retard and the vibration of valve body 7a tends to occur, the opening degree of waste gate valve 7 is not set to full opening but is set to the intermediate opening degree, and thereby the occurrence of abnormal sound can be suppressed. In addition, a target idling rotation speed is set in accordance with cooling water temperature TW, and the target idling rotation speed at the time of the engine cold state is set to relatively higher than that after warm-up.

Water temperature TW is gradually raised with the lapse of time from time t2 and the retard amount is gradually decreased. However, when cooling water temperature TW reaches threshold value TW1 at a time t3, the ignition timing retard is finished, and at the same time of this, the opening degree of waste gate valve 7 is changed to full opening. Consequently, the exhaust resistance becomes minimum.

In addition, as shown by a virtual line in FIG. 6, when the accelerator pedal is slightly depressed (that is, when accelerator opening degree APO exceeds threshold value APO0 corresponding to the full closing position) before cooling water temperature TW reaches threshold value TW1, the opening degree of waste gate valve 7 is changed from the intermediate opening degree to full opening. That is, the limitation of the opening degree to the intermediate opening degree is released, and the process proceeds to the regular opening control in step 8 of FIG. 4.

Figure 5:
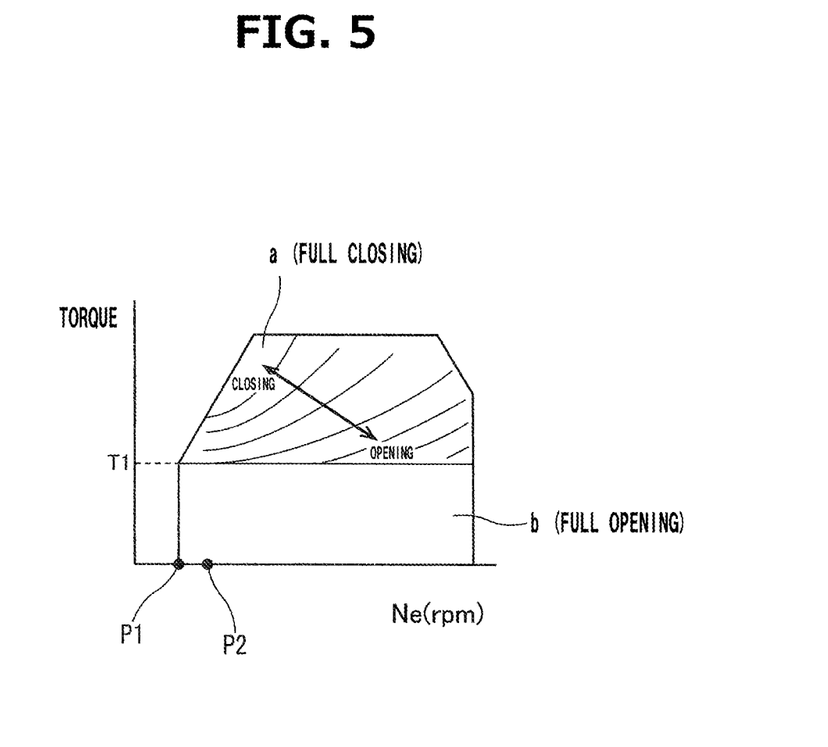
FIG. 5 is a characteristic diagram showing features of a waste gate valve opening degree to an engine operation condition.

In FIG. 5, a point P1 shows an idling operation point after warm-up, and a point P2 shows an operation point of the idling in the engine cold state. In these operation points P1 and P2, the opening degree of waste gate valve 7 is open-loop controlled regardless of the detection value of supercharging pressure sensor 15. That is, in idling operation point P1 after warm-up, the target opening degree of waste gate valve 7 is set to full opening, and in operation point P2 of the idling in the engine cold state, the target opening degree of waste gate valve 7 is set to the predetermined intermediate opening degree. In addition, as mentioned above, at the time of the idling in the engine cold state, the target idling rotation speed is set higher than that at idling operation point P1 after warm-up.

As the above, although an embodiment of the present invention has been explained, the present invention is not limited to the above embodiment. For example, although the temperature state of internal combustion engine 1 is judged based on a cooling water temperature in the above embodiment, the temperature state of the engine can be also judged based on other parameters such as lubrication oil temperature. In addition, although, in the above embodiment, the temperature of the temperature threshold value to determine whether or not the ignition timing retard is executed is the same as that of the temperature threshold value to determine whether or not the opening degree of the waste gate valve is limited to the intermediate opening degree, both of them may have slightly different temperature from each other.

Moreover, the judgement whether or not the opening degree of the waste gate valve is limited to the intermediate opening degree at the time of idling can be performed based on the execution of the ignition timing retard or the retard amount, regardless of a temperature condition.

Figure 7:
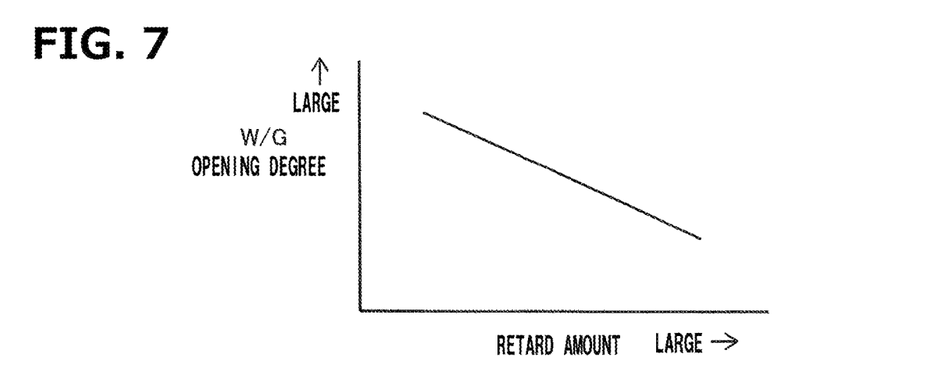
FIG. 7 is a characteristic diagram showing the relationship between an ignition timing retard amount and the waste gate valve opening degree.

In addition, although the value of the intermediate opening degree is a constant value in the above embodiment, it can be variably set in accordance with the size of the exhaust pulsation. For example, as shown in FIG. 7, it is also possible to variably set the target opening degree such that the opening degree of waste gate valve 7 is set to be smaller as the retard amount is larger.

In addition, as internal combustion engine 1, in case where an operation condition in which the exhaust pulsation becomes large except at the time of the idling in the engine cold state with the ignition timing retard (for example, a cylinder resting state) is included, when the operation condition in which the exhaust pulsation becomes large is detected, the opening degree of waste gate valve 7 can be limited to the intermediate opening degree, not to full opening.

The invention claimed is:

1. A waste gate valve control method for a waste gate valve which is provided to a turbocharger of an internal combustion engine, the waste gate valve control method comprising:
   controlling an opening degree of the waste gate valve to a full opening at an initiation of a cold start of the internal combustion engine; and
   controlling the opening degree of the waste gate valve to an intermediate opening degree during idling in a state in which the internal combustion engine is cold and in which an ignition timing retard is executed,
   wherein the intermediate opening degree is larger than zero and is smaller than an opening degree of the waste gate valve during idling in a state in which the internal combustion engine is warmed up.

2. The waste gate valve control method according to claim 1, wherein the opening degree of the waste gate valve during the idling in the state in which the internal combustion engine is warmed up is the full opening.

3. The waste gate valve control method according to claim 1, wherein the state in which the internal combustion engine is cold is a state in which an engine temperature is lower than a threshold value.

4. The waste gate valve control method according to claim 3, wherein in accordance with an ignition timing retard amount, the opening degree of the waste gate valve is set to be smaller as the retard amount is larger.

5. The waste gate valve control method according to claim 1, wherein the opening degree of the waste gate valve is controlled by an electric actuator.

6. The waste gate valve control method according to claim 1, wherein the intermediate opening degree is in a range of 40% to 50% of the full opening.

7. A waste gate valve control device, comprising:
   an internal combustion engine;
   a turbocharger provided with a waste gate valve;
   an actuator configured to control an opening degree of the waste gate valve;
   a supercharging pressure sensor configured to detect supercharging pressure;
   a temperature sensor configured to detect a temperature state of the internal combustion engine; and
   a control section configured to:
      output, to the actuator, a target opening degree of the waste gate valve based on the supercharging pressure detected by the supercharging pressure sensor, at a time of non-idling of the internal combustion engine;
      set the target opening degree of the waste gate valve to full opening, during idling in a state in which the internal combustion engine is not cold;
      set the target opening degree of the waste gate valve to full opening at an initiation of a cold start of the internal combustion engine; and
      set the target opening degree of the waste gate valve to an intermediate opening degree and output the set target opening degree of the waste gate valve to the actuator during idling in a state in which the internal combustion engine is cold and in which an ignition timing retard is executed,
   wherein the intermediate opening degree is larger than zero and is smaller than an opening degree of the waste gate valve during idling in a state in which the internal combustion engine is warmed up.

8. The waste gate valve control device according to claim 7, wherein the actuator is an electric actuator.

9. The waste gate valve control device according to claim 7, wherein the intermediate opening degree is in a range of 40% to 50% of the full opening.

* * * * *